Figure 1:
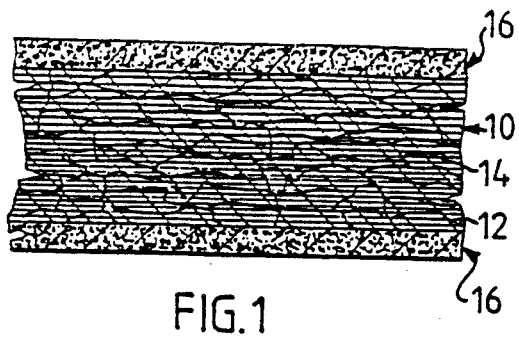

United States Patent [19]
Blümer

[11] Patent Number: 5,059,466
[45] Date of Patent: Oct. 22, 1991

[54] CHIPBOARD AND ITS MANUFACTURE

[75] Inventor: Hartwig Blümer, Järfälla, Sweden

[73] Assignee: Institutet for Trateknisk Forskning, Stockholm, Sweden

[21] Appl. No.: 566,398

[22] PCT Filed: Mar. 13, 1989

[86] PCT No.: PCT/SE89/00130

§ 371 Date: Aug. 20, 1990

§ 102(e) Date: Aug. 20, 1990

[87] PCT Pub. No.: WO89/08539

PCT Pub. Date: Sep. 21, 1989

[30] Foreign Application Priority Data

Mar. 16, 1988 [SE] Sweden ............................ 8800950

[51] Int. Cl.⁵ .......................... B32B 5/12; B32B 2/02; B27N 3/02
[52] U.S. Cl. ..................................... 428/106; 428/57; 428/114; 428/535; 156/62.2; 156/297
[58] Field of Search ...................... 428/57, 537.1, 106, 428/114, 535

[56] References Cited

FOREIGN PATENT DOCUMENTS

| 2103046 | 11/1971 | Fed. Rep. of Germany | 428/537.1 |
| 2818399 | 11/1979 | Fed. Rep. of Germany | 428/537.1 |
| 346945 | 7/1972 | Sweden . | |
| 253064 | 11/1948 | Switzerland | 428/537.1 |
| 485363 | 5/1938 | United Kingdom | 428/537.1 |

*Primary Examiner*—P. C. Sluby
*Attorney, Agent, or Firm*—Young & Thompson

[57] ABSTRACT

A method of manufacturing chipboard having a central layer of coarse chips and two outer layers of chips whose fibers are oriented in the plane of the board. The central layer is formed by using as chips therefor endgrain cut flake-like chips, the fibers of which are oriented in the direction of thickness of the chips, so that the chip fibers in the central layer are oriented substantially transversely to the plane of the board. The chipboard thus formed has low swelling with moisture and relatively light weight for its strength. Such chipboard also has relatively high bending strength and transverse strength.

2 Claims, 1 Drawing Sheet

CHIPBOARD AND ITS MANUFACTURE

The present invention relates to a method for the manufacture of chipboard, or particle board, comprising a centre layer of coarse chips and outer layers of chips whose fibres are positioned in the plane of the board.

Conventional chipboard comprised of a centre layer of coarse wood chips and sandwiching outer layers of finer wood chips are generally characterised by a high density. This high density can be ascribed primarily to the fact that the fibres in the centre layer are positioned parallel with the longitudinal axes of the chips, i.e. in a plane which extends substantially parallel to the plane of the manufactured board, and that the chips during the compression step required to form glue joints between the chips are compressed to an appreciable extent such that the density of the board will be substantially higher than the intrinsic density of the starting material. In the case of conventional chipboard manufacture, this increase in density will reach about 50%, such as to obtain a characteristic profile which corresponds to a given chipboard standard, for instance SIS 234 801.

A high density, however, results in chipboard of lower moisture stability, primarily thickness swelling. Furthermore, because of its high density, chipboard is normally considered to be heavy and difficult to handle. The manufacture of conventional chipboard also involves high costs for starting materials, i.e. chips, and glue, in addition to energy costs.

Against the background of the afore-described known technique, there is a desire for a method by means of which the density of chipboard can be reduced, and therewith a reduction in the consumption of starting materials, while retaining the same characteristic profile in general, or while improving said profile.

A method which touches partially upon this problem is described in SE-B-346 945. It is stated in this document (page 10, line 27 to page 22, line 27) that the size of the chips, the direction of chip fibres and the positioning or orientation of the chips in the board influences the properties of the finished chipboard, for instance such properties as density, swelling, mechanical strength, etc. For example, it has been found that when the longitudinal axes of the chip fibres are located transversely to the plane of the board, the board will be less compressible as a whole after being formed and the smaller particles located in the outer layers will be compressed to a greater extent than the particles located in the core of the board. For the purpose of obtaining chipboard in which a greater percentage of fibres are located with the longitudinal axes of the fibres extending transversely to or at an angle to the plane of the board, it has been proposed in accordance with SE-B-346 945 to use very short, essentially cubic chips as conventional wood chips, which because of their short lengths can be positioned with the long axes of the fibres extending both vertically and horizontally and in positions there between. There is obtained in this way random orientation of fibres in all directions.

For the purpose of reducing density and consumption of starting materials still further, while retaining the conventional, useful properties of the finished chipboard, or even improving the level of such properties, there is proposed in accordance with the invention a method which will impart a more refined and positive orientation of the chip fibres in the centre layer in a direction perpendicular to the plane of the finished board. To this end, it is proposed in accordance with the present invention that the chips used for the centre layer of the board are end-grain cut, flake-like chips whose fibres are oriented in the thickness direction of said chips, the chips fibres in the centre layer of the board being orientated substantially transversely to the plane of the board. By flake-shaped is meant here the shape of a body whose width and length are substantially greater than the thickness of the body. When using such flake-shaped chips, the chips will settle naturally on their respective base or top surfaces when forming the centre layer, the longitudinal axis of the fibres being oriented essentially transversely to the plane of the board. Due to the substantially unitary transverse direction of the fibres in the centre layer, a very high resistance to compression will be encountered in said layer during the compression stage, and consequently the conventional type chip particles which form the outer layers and whose fibres are orientated in the plane of the board are compressed to relatively thin layers of high density, whereas the volumetrically larger centre layer obtains a relatively low density. Tests have shown that when practicing the method proposed in accordance with the invention, there can be obtained three-ply chipboard whose total density is lower than the density of conventional chipboard, while retaining or improving the intrinsic or fundamental characteristic profile of the board. Consequently, chipboard manufactured in accordance with the novel method will require a smaller quantity of wood starting materials than conventional chipboard manufactures. This lower consumption of wood starting materials also decreases costs for glue and energy in the manufacture of said board. The resultant high mass surface density of the outer layers provides denser surfaces, which, for instance, decrease paint and varnish consumption when treating the surfaces of the board and enable the board to be lined with thinner paper liners.

The invention also relates to chipboard, or particle board, manufactured in accordance with the method and comprising a centre layer of coarse chips and outer layers of chips whose fibres are oriented in the plane of the board, the chips in the centre layer comprising end-grain cut, flake-shaped chips whose fibres are oriented in the thickness direction of the chips, the chip fibres in the centre layer being oriented substantially transversely to the plane of the board.

Figure 2:
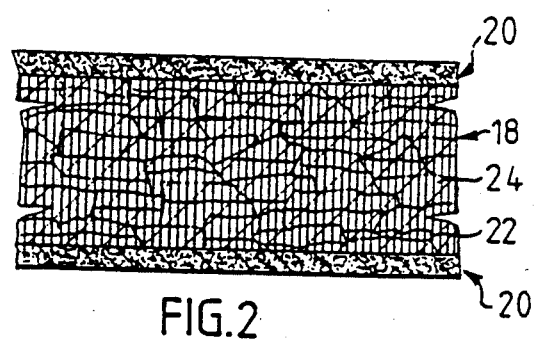
Figure 3:
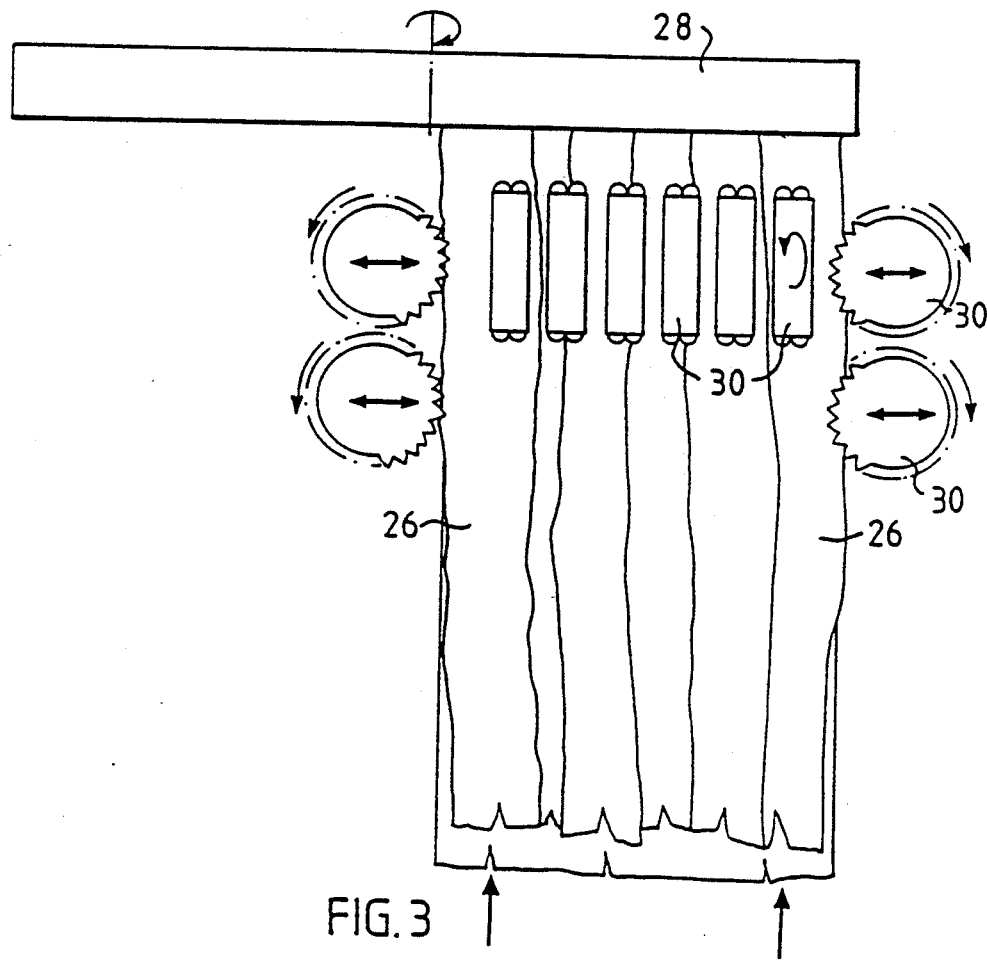

The invention will now be described in more detail with reference to the accompanying drawing, in which FIG. 1 is a schematic, longitudinal sectional view of conventional three-ply chipboard with the chip fibres extending substantially parallel to the plane of the board;

FIG. 2 is a schematic, longitudinal sectional view of three-ply chipboard manufactured in accordance with the present invention, with the chip fibres of the centre layer oriented substantially at right angles to the plane of the board; and FIG. 3 is a schematic plan view of apparatus for cutting endgrain chips intended for forming the centre layer chips of chipboard constructed in accordance with the invention.

The conventional three-ply chipboard illustrated in FIG. 1 consists of a centre layer 10 comprised of chips 12, the fibres of which are oriented in planes which extend substantially parallel with the plane of the finished board, as illustrated by lines 14. Two outer layers 16 contain finer chips, so as to provide a finer and denser surface structure subsequent to being pressed, the density of the outer layers being higher than the density of the centre layer. Board manufactured in this way will generally have a relatively high total density, resulting in heavy board, while the particular orientation of the fibres in the centre layer renders the board sensitive to moisture, which is manifested primarily in swelling of the board in the direction of its thickness. One reason for the high density of the centre layer is that the chips with fibres extending parallel to the plane of the board can be readily compressed, which means that a large quantity of wood starting material must be used in order to produce chipboard of given thickness and given acceptable fundamental characteristic profile.

The inventive chipboard, illustrated schematically in section in FIG. 2, consists of a centre layer 18 and two outer layers 20. In the case of the inventive chipboard, however, the centre layer 18 is composed of end-grain cut, flake-shaped chips 22, the fibres of which are oriented in the thickness direction of the chips, as illustrated by the lines 24.

As indicated above, the invention is based on the concept of utilizing the inherent resistance to compression of the wood chips, in a manner to achieve a reduction in the density of the finished board. This presumes an alternative method of producing the chips and of positioning the chips in the centre layer of the board. Thus, there is required a convertible starting material, such as round wood, slabs and edgings. In order to obtain a unitary chip fibre direction essentially transversely to the plane of the board when forming the centre layer, the chips 22 need to be end-grain cut chips which are so configured that, during forming of the centre layer, the chips will position themselves such that the largest dimension of the chips will lie parallel with the plane of the board. It has been found in practice that flake-like chips or disk-shaped chips are extremely well suited for this purpose.

FIG. 3 illustrates schematically an apparatus for producing end-grain cut chips suitable for use in the centre layer 18. Reference is made below to this apparatus in conjunction with a description of tests carried out on a laboratory scale in a comparison study between, on one hand, reference chipboard of conventional composition and manufacture, and, on the other hand, chipboard manufactured in accordance with the inventive method, this chipboard having a centre layer composed of flake-like end-grain cut chips and embraced by more dense, compressed outer layers.

Tests

An assortment of industrially produced chips were used as chip material in reference board and for the outer layers in end-grain board. The centre layer chips of the reference boards were knife cut with the fibre direction parallel with the longitudinal axis of the chips, the chips having a maximum length of about 30 mm.

The chips had an estimated maximum thickness of 2 mm. The outer chip layer comprised fine chips which fell within the fraction-composition used in the manufacture of furniture board having fine-chip outer layers.

The end-grain chips were produced from sawn, undried spruce planks measuring 65×155 mm.

Chip manufacture

In the manufacture of end-grain cut chips for the centre layer of the inventive chipboard, the planks 26 (FIG. 3) were cut to a length of 90 mm measured in the fibre direction. Chip cutting was effected with the aid of a rotating disk 28 having a diameter of 815 mm and provided with 8 knives (not shown) on one end side. The disk rotated at a speed of about 900 r.p.m. The following tool angles were measured: Rake angle $\gamma=45°$, edge angle $\beta=35°$, relief angle $\alpha=10°$. The knife setting, i.e. the distance between the flat disk and the knife edge, was selected at 1.0 mm. This setting corresponds to a nominal chip thickness of about 1.0 mm. In the manufacture of chips, the planks 26 were placed in a transport chute with the year rings of the planks facing towards the knife-carrying disk 28. The planks 26 were advanced by means of driven press wheels 30 which urged the planks against the disk. The resultant end-grain chips thus produced were then dried and fractionated by passing the chips through a flat laboratory screen provided with square-mesh wire screen inserts. The result is set forth in Table 1 below.

TABLE 1

| Fractional composition of the end-grain cut chips | | |
| --- | --- | --- |
| Fraction | Screen dimensions (mm) | Percentage (%) |
| I | >8.0 | 5.8 |
| II | 8.0–1.0 | 88.5 |
| III | <1.0 | 5.7 |

The fractions I and III were excluded in the subsequent board manufacturing process. Thus, solely fraction II was used. In this respect, the chips in fraction I can be made smaller and the chips in fraction III can be incorporated with the assortment of chips for producing outer layers in the industrial manufacture of chipboard.

Chipboard manufacture

Three-ply chipboard was manufactured at a nominal thickness of 20 mm and a density of 600 kg/m³. The centre layer constituted 60% of the thickness of the chipboard, whereas the outer layers constituted 40% of said thickness. For the purpose of studying the influence of layer density on the characteristic profile of the board, four density regions were selected for the centre and outer layers respectively.

Table 2 below discloses information concerning the nominal and measured layer density, the measured layer thicknesses in mm, the calculated layer distribution and chipboard designations. Reference chipboard was manufactured solely from conventional industrial chip assortments, and is referenced R.

TABLE 2

Nominal and measured density of surface and centre layers, and layer thicknesses.

| Board No. | Nominal density Surface layer (kg/m³) | Nominal density Centre layer (kg/m³) | Measured density Surface layer (kg/m³) | Measured density Centre layer (kg/m³) | Measured layer thickness Surface layer (mm) | Measured layer thickness Centre layer (mm) | Distribution Surface/Centre layer (%) |
| --- | --- | --- | --- | --- | --- | --- | --- |
| 1 | 825 | 450 | 960 | 400 | 3.3 | 13.0 | 34/66 |
| 1R | 825 | 450 | 780 | 480 | 4.1 | 11.0 | 43/57 |
| 2 | 750 | 500 | 960 | 410 | 2.9 | 13.8 | 30/70 |
| 2R | 750 | 500 | 790 | 450 | 4.0 | 11.3 | 41/59 |
| 3 | 675 | 550 | 980 | 400 | 2.6 | 14.5 | 27/73 |
| 3R | 675 | 550 | 780 | 460 | 3.8 | 11.6 | 40/60 |
| 4 | 600 | 600 | 910 | 430 | 2.4 | 14.8 | 24/76 |
| 4R | 600 | 600 | 810 | 500 | 2.6 | 14.2 | 27/73 |

The difference between desired nominal board density and the measured density will be clearly seen from the table.

It will also be seen from Table 2 that board manufactured from end-grain centre-layer chips in accordance with the invention achieves the desired surface distribution only at a low centre layer density (board 1).

All reference board manufactured from industrially used chip assortments, with the exception of board 4R, achieve the desired layer distribution 40/60.

The method in which the end-grain cut chips intended for the centre layer (i.e. the fibre direction) and the geometry of said chips (flake-shaped) are considered to have contributed to increased compression already in the low density regions.

The boards were hand-formed, sheet for sheet, in a forming box measuring 300×300 mm. Pressing was effected under high pressure in a hot press at a temperature of 180° C. Press plates and spacer strips were used in the pressing operation. The press closing time, i.e. the time lapse between upper press-plate contact and spacer strip contact, was very short in the case of the reference boards, more specifically an average time lapse of 10 seconds. Corresponding boards having centre layers comprising end-grain chips engendered a compression resistance which resulted in a compression time of 30–40 seconds.

The influence of press closing time and compression resistance on layer thickness and layer density can be seen from Table 3 below, which discloses the density factor. By density factor is meant here the ratio of the surface layer density to the centre layer density. The factor is given both for the nominal density values and for the measured values. The table also includes compression, i.e. the ratio of measured and nominal factors (increase and decrease in layer density). The table shows a marked increase in compression with increased centre layer density of board manufactured from end-grain, centre-layer chips in accordance with the invention. On the other hand, reference boards show a decrease (1R) and a small increase (2R and 3R) in compression. Board 4R having the highest centre-layer density also exhibits the greatest increase in compression (Table 3), which corresponds substantially to that of board 2 which has a lower centre-layer density of about 100 kg/m³ (Table 2).

TABLE 3

Density factors and compression.

| Board No. | Density factor Nominal | Density factor Measured | Compression Increase (+) Decrease (−) (%) |
| --- | --- | --- | --- |
| 1 | 1.83 | 2.40 | +31 |
| 1R | 1.83 | 1.63 | −11 |
| 2 | 1.50 | 2.34 | +56 |
| 2R | 1.50 | 1.76 | +17 |
| 3 | 1.23 | 2.45 | +99 |
| 3R | 1.23 | 1.70 | +38 |
| 4 | 1 | 2.12 | +112 |
| 4R | 1 | 1.62 | +62 |

Testing of inherent properties

The mechanical strength properties of the boards were tested in accordance with Swedish chipboard standards (SIS 234801). Four sample bodies were taken from each board, for the purpose of determining the bending strength of the board. Two test bodies were then taken from the aforesaid test bodies and tested for transverse tensile strength, each body being placed around the fracture location.

The test carried out on the dimensional stability of the boards was restricted to investigating swelling of the boards in the direction of their thicknesses, subsequent to being submerged in water for 2 hours and 24 hours respectively. Ten test bodies from each board were included in this test. It can be mentioned that all boards had been rubbed down with an abrasive prior to being tested. The prevailing density of each test body was also determined.

Results

The results obtained when testing the intrinsic properties of the board are set forth in Table 4 below. The table shows the measured characteristic properties as a mean value $\bar{x}$ with associated standard deviations s for each individual chipboard. Within each density range (combination of surface density and centre layer density) chipboard comprising end-grain centre layers was compared with reference chipboard whose centre layers comprised conventional industrial chips.

TABLE 4

Results obtained when determining characteristic properties - transverse tensile strength, bending strength and thickness swelling.

| Board No. | Transverse tensile strength | | | Bending strength | | | Thickness swelling | | | | |
|---|---|---|---|---|---|---|---|---|---|---|---|
| | x̄ (MPa) | s (MPa) | density (kg/m³) | x̄ (MPa) | s (MPa) | density (kg/m³) | 2 h x̄(%) | 2 h s(%) | 24 x̄(%) | 24 s(%) | density (kg/m³) |
| 1 | 0.57 | 0.05 | 586 | 20.80 | 2.37 | 584 | 13.5 | 0.7 | 19.0 | 1.3 | 577 |
| 1R | 0.44 | 0.07 | 603 | 17.71 | 1.55 | 605 | 17.5 | 0.7 | 20.5 | 1.0 | 605 |
| 2 | 0.66 | 0.06 | 583 | 19.69 | 2.40 | 584 | 13.8 | 0.8 | 19.9 | 1.5 | 581 |
| 2R | 0.43 | 0.06 | 596 | 17.96 | 0.85 | 600 | 17.8 | 0.6 | 21.1 | 1.0 | 582 |
| 3 | 0.66 | 0.08 | 574 | 16.69 | 1.26 | 572 | 13.5 | 0.9 | 21.1 | 1.6 | 566 |
| 3R | 0.49 | 0.05 | 581 | 16.09 | 1.90 | 588 | 16.6 | 0.4 | 19.8 | 0.6 | 573 |
| 4 | 0.71 | 0.06 | 577 | 16.65 | 2.36 | 579 | 14.8 | 1.7 | 24.9 | 2.3 | 570 |
| 4R | 0.51 | 0.09 | 601 | 19.12 | 3.36 | 606 | 18.0 | 0.2 | 21.5 | 0.5 | 594 |

Transverse tensile strength

The mechanical strength of chipboard is density dependent. In the case of chipboard having a conventional centre layer structure, i.e. a structure in which the chip fibres are positioned parallel with the plane of the board, the density of the centre layer is a criterion the transverse tensile strength of the board. Test bodies drawn from the transverse tensile strength test exhibit centre layer fractures, thus also confirming the strength influencing function of the centre layer. A closer study of the results obtained with the transverse tensile strength test will show that board whose centre layers comprise end-grain cut chips have a lower centre-layer density throughout in comparison with corresponding reference board, irrespective of the board type (1–4) measured in accordance with Table 2. This reduction in density is calculated as being 10–20%. The reduction in centre layer density resulted in an increase in the outer layer density of end-grain cut board by 12–25%.

The tests showed that with a board density of 600 kg/m³, the end-grain boards had a transverse tensile strength of 0.5–0.70 MPa. Corresponding values for conventional reference boards were 0.45–0.50 MPa. The end-grain boards had these last mentioned values at densities as low as 525 kg/m³. Thus, the greater transverse tensile strength of end-grain board can be utilized in decreasing the board density. The extent of this reduction, however, is limited by the lowest permitted strength values.

Bending strength

Distinct from the centre-layer-density dependency of the transverse tensile strength, the bending strength of board is highly dependent on the density of the outer layers. As earlier established, the surface layer density of end-grain cut board is 12–25% higher than the surface layer density of reference board. This also implies higher strength values in the case of bending or flexural loads. In the case of end-grain cut board having a density of 600 kg/m³, the bending strength is from 18–22 MPa, depending on layer density distribution. Corresponding values for reference board (R-board) is 17–18.5 MPa. In the case of the end-grain cut board 1 and 2, these reference board values were achieved at densities as low as 550 kg/m³.

Depending on the lowest permitted bending strength values, the board density of end-grain cut boards can be made about 50 kg/m³ lower than conventionally manufactured board, while still achieving the same bending strength.

Thickness swelling

The centre layer density, and therewith compression, influences the behaviour of chipboard in the presence of moisture. For instance, thickness swelling of board will increase with increased density, which as a rule has been produced by greater compression. Various methods are available for restricting swelling, at least with respect to short-term swelling (storage in water for less than 2 hours). No swelling inhibiting methods were applied during the present investigation, however. Consequently, the absolute swelling values recorded can be understood as being very high.

Prior to carrying out the swelling tests, the moisture quotients of the test bodies were measured, wherewith it was found that the test bodies taken from end-grain board had a board moisture quotient of 4.0%. Corresponding values for the reference boards were 4.9%.

Table 4 shows the swelling values with associated centre layer density. In the case of end-grain boards 1–4, swelling was measured after storing the test bodies in water for 2 hours, and was found to be on average 13.9%. Corresponding average values for reference boards 1R–4R were found to be 17.5%. The difference between the swelling of end-grain board and reference board after being stored for 24 hours in water are practically nonexistent. The higher centre layer density of the endgrain boards 3 and 4 engender higher swelling after 24 hours than the boards 1 and 2. The relationship between density and swelling in the case of the reference boards is less distinct. With respect to swelling (2 and 24 hours), the end-grain boards 1 and 2 offer advantages over the corresponding reference boards 1R and 2R. Consequently, a composition according to types 1 and 2 should be chosen for conceivable industrial manufacture.

The afore-described tests carried out on mutually different kinds of centre-layer chips illustrates that the characteristic profile of three-ply chipboard can be influenced by the construction of the centre layer. It can therewith be established that end-grain chips improve such properties as transverse tensile strength, bending strength and thickness swelling in a marked manner within a given board density range compared with conventionally manufactured chips, in which the chip fibres are oriented in the plane of the board. This fact can be utilized to manufacture board of improved characteristic profile and/or in reducing the total board density. A reduction in board density can assist generally in achieving a reduction in costs, inter alia with respect to wood, glue, energy, transportation, etc. Low weight chipboard is desirable to the user of such board, and such low weight chipboard can be produced in accordance with the invention, as defined in the following claims.

I claim:

1. Chipboard comprising a central layer of coarse chips and two juxtaposed outer layers of chips whose fibers are oriented in the plane of the board, wherein the chips in the central layer consist of end-grain cut flake-like chips, the fibers of which are oriented in the direction of thickness of the chips, whereby the chip fibers of the central layer are oriented substantially transversely to the plane of the board.

2. In a method of manufacturing chipboard having a central layer of coarse chips and two outer layers of chips whose fibers are oriented in the plane of the board; the improvement comprising forming said central layer by using as chips therefor end-grain cut flake-like chips, the fibers of which are oriented in the direction of thickness of the chips, whereby the chip fibers in the central layer are oriented substantially transversely to the plane of the board.

* * * * *